United States Patent
Vetter et al.

(10) Patent No.: US 11,524,374 B2
(45) Date of Patent: Dec. 13, 2022

(54) CONVEYING SYSTEM FOR SIMULTANEOUSLY TRANSPORTING WORKPIECES AND WORKERS

(71) Applicant: EISENMANN SE, Böblingen (DE)

(72) Inventors: Svenja Vetter, Neustetten (DE); Herbert Schulze, Aidlingen (DE)

(73) Assignee: EISENMANN GMBH, Böblingen (DE)

( * ) Notice: Subject to any disclaimer, the term of this patent is extended or adjusted under 35 U.S.C. 154(b) by 483 days.

(21) Appl. No.: 16/488,278

(22) PCT Filed: Jan. 24, 2018

(86) PCT No.: PCT/EP2018/051694
§ 371 (c)(1),
(2) Date: Nov. 25, 2019

(87) PCT Pub. No.: WO2018/153604
PCT Pub. Date: Aug. 30, 2018

(65) Prior Publication Data
US 2020/0130115 A1    Apr. 30, 2020

(30) Foreign Application Priority Data
Feb. 24, 2017   (DE) .................... 10 2017 103 931.7

(51) Int. Cl.
*B23P 21/00*   (2006.01)
*B62D 65/02*   (2006.01)
*B62D 65/18*   (2006.01)

(52) U.S. Cl.
CPC .......... *B23P 21/004* (2013.01); *B62D 65/022* (2013.01); *B62D 65/18* (2013.01); *B23P 2700/50* (2013.01)

(58) Field of Classification Search
CPC ............... B62D 65/18; Y10T 29/53365; Y10T 29/5337
See application file for complete search history.

(56) References Cited

U.S. PATENT DOCUMENTS 4,930,213 A * 6/1990 Hayakawa .......... B05B 13/0264
198/470.1
6,651,799 B1* 11/2003 Rice ..................... B23Q 1/0054
198/465.1

(Continued)

FOREIGN PATENT DOCUMENTS

CA   2 743 706 A1   6/2010
CA   3 004 554 A1   6/2010

(Continued)

*Primary Examiner* — Sarang Afzali
(74) *Attorney, Agent, or Firm* — Schroeder Intellectual Property Law Group, LLC (57) ABSTRACT

A conveying system for simultaneously transporting workpieces and workers having a plurality of vehicles, which each have a workpiece receptacle, an assembly platform for workers to move around on, and a separate drive, with which each vehicle can be driven independently of other vehicles of the conveying system. Furthermore, the conveying system includes a plurality of workstations, which are set up for carrying out different work steps. A control device is configured to control the vehicles such that they can pass individually through a different succession of workstations depending on the transported workpiece.

11 Claims, 8 Drawing Sheets

(56) References Cited

U.S. PATENT DOCUMENTS

| | | | |
|---|---|---|---|
| 8,122,579 B2 | 2/2012 | Taniguchi et al. | |
| 10,040,423 B2 * | 8/2018 | Boesen | A61S 5/117 |
| 2004/0007440 A1 * | 1/2004 | Doan | B62D 65/18 |
| | | | 198/468.8 |
| 2008/0276827 A1 | 11/2008 | Roeckle et al. | |
| 2009/0115610 A1 | 5/2009 | Steinhage et al. | |
| 2011/0099788 A1 | 5/2011 | Kilibarda | |
| 2012/0285797 A1 | 11/2012 | Ooe | |
| 2013/0125777 A1 | 5/2013 | Yamaguchi et al. | |
| 2014/0262680 A1 | 9/2014 | Laurence et al. | |
| 2018/0229933 A1 | 8/2018 | Hofmann | |

FOREIGN PATENT DOCUMENTS

| | | |
|---|---|---|
| CA | 2 743 706 C | 7/2018 |
| CN | 101 228 064 A | 7/2008 |
| CN | 102 239 455 A | 11/2011 |
| CN | 103 052 551 A | 4/2013 |
| CN | 105 263 832 A | 1/2016 |
| CN | 204 935 664 U | 1/2016 |
| CN | 106 241 195 A | 8/2016 |
| DE | 40 20 286 | 1/1992 |
| DE | 10 2005 018 424 | 11/2006 |
| DE | 10 2005 034 582 | 2/2007 |
| DE | 10 2006 007 780 | 8/2007 |
| DE | 20 2007 015 654 | 3/2009 |
| DE | 10 2008 013 431 | 5/2009 |
| DE | 10 2011 105 595 | 12/2012 |
| DE | 10 2012 107 511 | 2/2014 |
| DE | 10 2015 103 642 | 8/2016 |
| DE | 10 2015 214 980 | 2/2017 |
| JP | S61155075 A | 7/1986 |
| JP | 2017-007074 | 1/2017 |
| WO | 2008/131704 | 11/2008 |
| WO | 2011/053681 | 5/2011 |

\* cited by examiner

CONVEYING SYSTEM FOR SIMULTANEOUSLY TRANSPORTING WORKPIECES AND WORKERS

RELATED APPLICATIONS

This application is a national phase of International Patent Application No. PCT/EP2018/051694 filed Jan. 24, 2018, which claims priority to German Patent Application No. 10 2017 103 931.7 filed Feb. 24, 2017 — the contents of both of which are incorporated herein by reference.

BACKGROUND OF THE INVENTION

1. Field of the Invention

The invention relates to a conveyor system and a method for the simultaneous transport of motor vehicles or other workpieces and of workers in manufacturing plants. Such conveyor systems are used in particular in the final assembly of motor vehicles, large household appliances or machines manufactured in large quantities.

2. Description of the Prior Art

During the final assembly of workpieces, conveyor systems in which the workers are transported together with the workpieces over a longer period of time are often used. In doing so, workers can perform work on the workpieces without having to run beside the workpieces.

The vehicles of these known conveyor systems comprise a workpiece mount for fastening the workpiece, an assembly platform that can be walked on by the workers and a chassis with wheels. Usually, the vehicles form a pushed unit, while they transport workers together with the workpieces. The respective last vehicle thereby pushes the vehicles in front from behind, wherein it is driven by stationary external drive means. These drive means can, for example, be friction wheels which engage from the outside on the long sides of the respective last assembly platform and in this way apply the pushing force required for the forward movement of the entire pushed unit. By pushing from behind, the assembly platforms within the pushed unit adjoin each other without gaps, so that the workers can safely transfer to adjacent assembly platforms. At the end of a production section, the pushed unit is frequently dismantled again. For this purpose, the workpieces are usually removed from the vehicles. The empty vehicles are then transferred vertically or horizontally in a transfer station and return back empty on another conveyor section. Instead of permanently dismantling the pushed unit, the vehicles can also be separated in the short-term and conveyed on a curve to a further production section, where they again form a pushed unit.

A conveyor system of this type is known from DE 40 20 286 C2. However, the vehicles described there also comprise their own drives. As a result, the vehicles can move independently between the production sections. As soon as a vehicle is included in the pushed unit, the self-propulsion is switched off. A special feature of the vehicles of this known conveyor system is that the drive wheels can be steered by about 90° degrees. This allows the vehicles to travel transversely to the next production section, where they are picked up by the next pushed unit.

A similar conveyor system is known from DE 10 2005 034 582 A1. Here, the vehicles also have their own drive, which is also used for conveying in a pushed unit. This eliminates the need for external stationary drive means. The vehicles therefore do not have to withstand the high longitudinal and transverse forces caused by the lateral friction wheels when traveling in the pushed unit. The vehicles can thereby be built lighter.

DE 10 2005 018 424 A1 describes another way of reducing weight. It proposes assembly platforms for such vehicles, which are manufactured in lightweight construction.

Traveling in a pushed unit, however, also has several disadvantages. For example, today motor vehicles are increasingly being individualised. As a result, it is becoming increasingly common for individual motor vehicles to require considerably more or different processing steps than other motor vehicles of the same model. In addition, some manufacturers are already assembling different models on the same production line in order to achieve a more even workload. Until now, all processing stations are arranged one behind the other, so that every motor vehicle passes through all processing stations, even if no processing at all takes place there.

Similar problems also arise with other workpieces, e.g. large household appliances or machines manufactured in large quantities.

SUMMARY OF THE INVENTION

It is therefore an object of the invention to provide a conveyor system and a method for the simultaneous transport of workpieces and workers which is better adapted to modern production procedures.

According to the invention, this object is solved by a conveyor system for the simultaneous transport of workpieces and workers, which comprises a plurality of vehicles each having a workpiece mount, an assembly platform and its own drive. The drive is configured to drive the respective vehicle independently of other vehicles of the conveyor system. Furthermore, the conveyor system comprises a plurality of processing stations configured to perform different processing steps. The conveyor system also includes a control device for controlling the vehicles, which can be fully centralised, but can also comprise additional local controls on the individual vehicles. According to the invention, the control device is configured to control the vehicles such that they can individually travel different sequences of processing stations depending on the transported workpiece.

The conveyor system according to the invention thus combines the advantages of mobile assembly platforms and automated guided vehicle systems (AGV), with which up to now only workpieces, but not workers, are transported. Like automated guided vehicle systems, the vehicles according to the invention can drive independently and without trailing cables. The vehicles therefore have their own drive and a suitable power supply, for example in the form of an accumulator. Depending on the specific local conditions and the control system adapted thereto, the vehicles according to the invention usually require navigation means to independently find their way to the next processing station. For position finding, radio-based navigation systems, ultrasound or laser scanners can be used, for example, which determine the angles to reflective strips that are attached at certain points along the conveying path. In addition, navigation using television cameras and pattern recognition are also considered. In most cases, for safety reasons, obstacle detection means will also be provided. This can be, for example, a laser scanner that can detect obstacles and in particular people and initiate braking or an evasive manoeuvre.

With vehicles equipped in such a way, it is possible to individually travel different sequences of processing stations. In contrast to conventional conveyor systems, in which all vehicles move one behind the other in a pushed unit, the vehicles thus only have to drive to those processing stations that are actually required for processing the transported workpiece. The workers can remain on the assembly platform during the drives between the processing stations and use the time for processing the workpiece. Depending on the requirements of the individual case, however, it may make more sense for the workers to leave the assembly platform before all or before certain drives. The vehicle then only transports the workpiece, but not the workers, to the next processing station.

Whereas during transport in a pushed unit the processing stations are all arranged along a production line, the processing stations of the conveyor system according to the invention can be arranged distributed such that they can in part only be approached by the vehicles by traveling sideways or cornering but without a reversal of the direction of travel. As a result, individual production lines can be split into several sublines—similar to a marshaling yard—and reunited later.

In contrast to conventional production lines, the processing stations no longer have to in principle be arranged substantially one behind the other along a straight, meandering or any howsoever winding line. The conveyor system according to the invention makes it possible to allow the processing stations to travel completely freely within a given production area. The manufacturing procedures therefore no longer have to be "linearly" organized, but can also be freely varied—at least within certain limits.

Whereas previously, for example, it had to be determined whether a door panel or a windscreen wiper has to first be installed on a motor vehicle, this decision can now be made dependent on whether the processing station in question is currently occupied by another vehicle or not. The vehicles can, for example, be controlled such that they inform the control device at predetermined time points or in an event-controlled manner about the type and the state of completion of the respective workpiece being transported. The control device then determines for each vehicle at least one processing station to be approached next and preferably the sequence of all processing stations still to be approached, taking into account the occupancy status of the processing stations with other vehicles.

If the control device does not receive any information about the type and state of completion of the transported workpiece, then it cannot know whether a certain processing step has been fully completed, a full completion was not possible (e.g. due to a missing part) or the processing was carried out but with a faulty result. Only with this information can the control device make a reasonable decision about which processing station is to be approached next.

In principle, however, it is also conceivable to shift more "intelligence" to the vehicles themselves. In this case, the control device can, for example, inform the vehicles about the occupancy status of all processing stations. The vehicles then decide independently which processing stations to seek next. The vehicles inform the control device of this decision so that it can regard the processing station concerned as occupied for a certain period of time and distribute this information to the other vehicles.

Varying the locations of the processing stations within a given production area is also considered. The processing stations themselves are then designed as mobile units that can be moved within certain limits within the production area in order to adapt variably to the number and type of workpieces to be produced. The autonomously driving vehicles of the conveyor system according to the invention are able to orient themselves at any time in such a variable arrangement of processing stations and to find the way to the next processing station.

Since cornering requires comparatively a lot of free space, the vehicles can each have an omnidirectional drive with which the vehicles can drive in any direction from a standstill. The omnidirectional drives can comprise, for example, omniwheels, Mecanum wheels or drive-turn-modules, as is known as such in the state of the art.

With such an omnidirectional drive, the vehicles can, for example, be turned or turned around on the spot. It is also possible to move the vehicles sideways without cornering. This allows them to be removed from a line in a space-saving manner in order to travel to a specific processing station or to allow the following vehicles to overtake. Conversely, the vehicles can also be controlled such that a first vehicle overtakes a second vehicle while the second vehicle is in a processing station.

Particularly when workers are on the assembly platforms while the vehicles are driving, it must be ensured that workers are not endangered when starting, braking or during other driving manoeuvres. According to the invention, the vehicles therefore each have a detection device configured to detect the presence of a worker on the respective assembly platform. The detection device can, for example, be a touch-sensitive floor covering which covers at least part of the assembly platform. The control device can be configured such that, in the event that a worker is on the assembly platform, the vehicle is either not allowed to start moving at all or certain driving manoeuvres (acceleration, braking, cornering, etc.) may only occur after an optical or acoustic warning signal has been emitted beforehand. In addition it is considered that, if a worker is present on the assembly platform, certain driving manoeuvres may only be carried out with restrictions. For example, it may be specified that the accelerations in the longitudinal or transverse direction occurring during driving manoeuvres must remain below predetermined limit values.

Preferably, the detection device is configured to detect not only the presence of a worker as such, but also his location on the respective assembly platform. Then the control of the vehicle can also be made dependent on this location information. If, for example, a worker is at the rear end of the assembly platform in the direction of travel, additional acceleration can quickly cause the worker to fall over the rear edge of the assembly platform. In such a case, the acceleration process should be carried out with particular care or additional measures should be taken to ensure that the worker holds tight on the assembly platform before the acceleration process begins.

The higher the location resolution of the detection device, the better the control device can make the driving manoeuvres of the vehicles dependent on where the worker or workers are on the assembly platform. Ideally, the location resolution is at least 50 cm.

It is also advantageous if the detection device comprises an identification element to be worn by the worker and a reading device arranged on the vehicle and configured to read information stored on the identification element contactlessly. In this way, the detection device can determine whether the correct worker is on the assembly platform of the vehicle concerned. As the overall driving operation becomes complex due to the autonomous approaching of different processing stations, it is important that the workers can verify that they are on the right vehicle at the right time. For example, the control device can then control the vehicles such that the vehicles can only then start when all the workers required for the next processing step are on the assembly platform. Warning notices can also be generated individually for single workers. The identification element can, for example, be an RFID transponder whose information is read by radio, or a QR code whose information is read optically.

It is also possible to provide all or at least all large parts to be installed with an RFID transponder or other identification element that can be read contactlessly. In this way, by retrieving all the identification information, it is possible to determine whether the correct parts have been installed in the workpiece concerned and/or the parts held ready for installation actually fit the workpiece. If the production area has a dense network of reading devices, a complete detection of all workpieces, parts and workers can also occur. The thereby achievable location resolution is determined by the density of the reading devices.

As an alternative to the detection devices on the vehicles, an external detection of the workers can also be provided. For example, cameras can be installed in the entire production area to monitor all areas of the production area where vehicles may be located. Preferably, the vehicles are equipped with a rechargeable electrical energy storage to provide the energy required for driving, which can be recharged while the vehicles are driving. This means that the vehicles do not have to drive to a charging station to recharge the electrical energy storage, but can be recharged during their use in production operation. However, it is of course also conceivable that the electrical energy storage of a vehicle can only be charged when the vehicle is at a standstill. This can possibly also be the case in a processing station.

The processing stations regularly differ from each other by the tools and/or handling devices and/or assembly robots arranged there. A further distinguishing criterion can be parts or materials that are required for production and are provided at the processing stations. In the broader sense, those stations, in which no processing of the workpiece in the narrower sense occurs, but where only parts, materials or tools are refilled, exchanged or removed, are also viewed as processing stations.

Preferably, the assembly platform of a vehicle extends over the entire length of the vehicle. However, providing the front and/or rear of the vehicle with stationary storage equipment which cannot be walked on is also considered.

Due to the individualisation of the driving performed in the conveyor system according to the invention, it cannot be ruled out that successive vehicles touch each other temporarily during driving such that they form a unit. Processing stations, which must be approached by all vehicles, can then be arranged one behind the other in a line as before.

In an advantageous embodiment, at least one vehicle has an input device which is accessible to a worker located on the assembly platform and via which the worker can specify to the control device a processing station which the vehicle concerned still has to approach. Such an input device can be fixed in place to the vehicle but can also communicate wirelessly with the vehicle or directly with the control device. The worker then has the option, for example, of approaching a processing station anew if he has detected a manufacturing or assembly error. The control device ensures that the vehicle concerned changes its route and approaches the processing station concerned or another processing station in which the same processing step can be performed.

In several embodiments at least one vehicle is composed of several subunits. These subunits are arranged side by side transversely with respect to a longitudinal direction of the vehicle and are detachably coupled to each other, which includes both mechanical couplings, usually based on a form fit, as well as control-related couplings in which the subunits travel next to each other at a constant distance or slightly touching each other. The subunits also comprise chassis which are separate from one another so that the subunits can be moved separately and independently of one another after uncoupling. At least one and preferably all subunits also have their own drive.

The flexibility of the conveyor system can be further increased by such a subdivision of the vehicles into subunits. Uncoupling one or more subunits may be useful, for example, if for certain operations access at locations normally filled by the assembly platform is required. Instead of lifting the workpiece with a lifting device, lateral subunits of the assembly platform can be uncoupled and removed to better reach parts at the bottom of the workpiece.

It is particularly advantageous if one of the subunits is a workpiece carrier unit, which comprises the workpiece mount, and if another subunit is a platform unit, which can be walked on at least substantially freely by workers. Thus, the different functions of the vehicles, namely the transport of the workpieces and the transport of the workers, are assigned to subunits independent from one another.

It is particularly advantageous if the at least one vehicle has two platform units that are coupled to the workpiece carrier unit on both sides. If the platform units are decoupled, a narrower workpiece carrier unit remains, which can, for example, be directed to a processing station in which only robots are active and from which workers must be kept away for safety reasons. The workers can then travel on the platform units to another workpiece carrier unit (and vice versa) in order to connect with it. If the platform unit has a recess in which the workpiece carrier unit is inserted laterally, the subunits can be connected to each other in a particularly stable manner by form fit.

At least one subunit can have an omnidirectional drive with which the subunit can drive in any direction from a standstill.

In another embodiment, the platform unit is shorter along the longitudinal direction than the workpiece carrier unit. This makes it possible, for example, to move the shorter platform unit along the side of the workpiece carrier unit at a speed that differs from the speed of the workpiece carrier unit. This results in a relative movement between the workpiece carrier unit and the platform unit without the platform unit protruding beyond the front or rear end of the workpiece carrier unit. Such a relative movement may be desirable in certain processing operations, e.g. when a worker is to attach a trim to the side of a motor vehicle. The platform unit is then coupled to the workpiece carrier unit such that it can be moved longitudinally along the workpiece carrier unit when the electrical control-related or mechanical coupling is closed.

With regard to the method, the object set at the beginning is solved by a method for the simultaneous transport of workpieces and workers, in which a plurality of vehicles are provided, each having a workpiece mount, an assembly platform which can be walked on by workers and its own drive configured to drive the respective vehicle independently of the other vehicles. According to the invention, the vehicles are controlled such that, depending on the transported workpiece, they individually travel different sequences of processing stations configured to perform different processing steps.

The advantageous effects and embodiments explained regarding the conveyor system according to the invention apply insofar accordingly.

A control device can be informed by the vehicles at predetermined time points or in an event-controlled manner about the type and the state of completion of the respective workpiece being transported. The control device then determines for each vehicle at least one processing station to be approached next and preferably the sequence of all processing stations still to be approached, taking into account the occupancy state of the processing stations with other vehicles.

At least some of the processing stations can be arranged distributed such that they can only be approached by the vehicles by traveling sideways or cornering but without a reversal of the direction of travel.

The vehicles can have an omnidirectional drive with which the vehicles can drive in any direction from a standstill.

A detection device on the vehicles can detect the presence of a worker on the respective assembly platform, preferably location resolved, wherein the location resolution is preferably at least 50 cm.

If the workers wear an identification element, a reading device arranged on the vehicle can read information stored on the identification element contactlessly.

The detection device can comprise a touch-sensitive floor covering which covers at least part of the assembly platform.

The vehicles can have a rechargeable electrical energy storage to provide the energy required for driving, which is recharged while the vehicles are driving.

The processing stations can be distinguished from each other at least by the tools and/or handling devices and/or assembly robots arranged there.

The vehicles can be controlled such that a first vehicle overtakes a second vehicle while the second vehicle is in a processing station.

Successive vehicles can touch each other at least at times while driving and thus form a unit.

At least one vehicle can have an input device which is accessible to a worker located on the assembly platform and via which the worker can specify to the control device a processing station which the vehicle concerned still has to approach.

BRIEF DESCRIPTION OF THE DRAWINGS

In the following, embodiments of the invention are explained in more detail based on the drawings.

DESCRIPTION OF PREFERRED EMBODIMENTS

1. Prior Art: Traveling in a Pushed Unit

Figure 1:
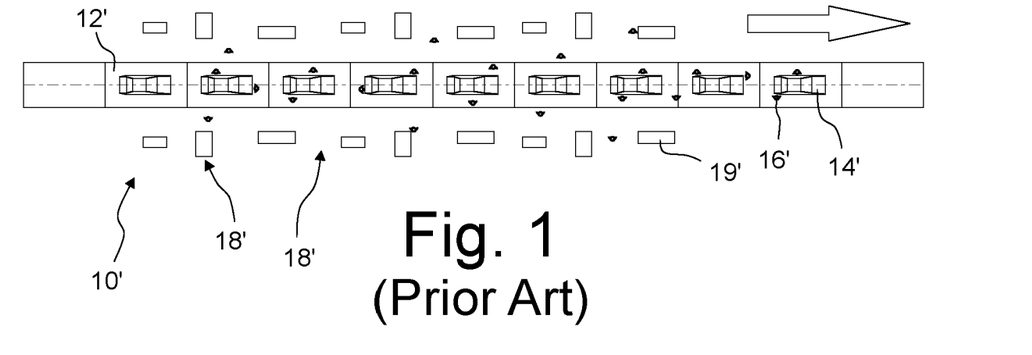
FIG. 1 shows a conveyor system known from Prior Art, in which a plurality of vehicles mutually form a pushed unit.

FIG. 1 shows in a schematic top view a conveyor system 10' known from Prior Art, in which a zo plurality of vehicles 12' form a pushed unit along a production line. Each vehicle 12' has an assembly platform which, in the example shown, carries a motor vehicle 14' and one or more workers 16'. The vehicle 12', which, seen in the direction of conveyance indicated by an arrow, travels at the very rear, is driven by friction wheels which are not shown and pushes the other vehicles 12' in front of it. The production line also includes storage equipment 18', indicated by rectangles, in which parts to be assembled, tools and other materials are stored.

At the end of the production line shown in FIG. 1, the workers 16' leave the assembly platform of the vehicles 12'. In addition, the motor vehicles 14' are removed and taken to further processing steps. The empty vehicles 12' are moved to another conveyor level with the aid of a lifting device which is not shown, where they are conveyed back to the starting point.

Figure 2:
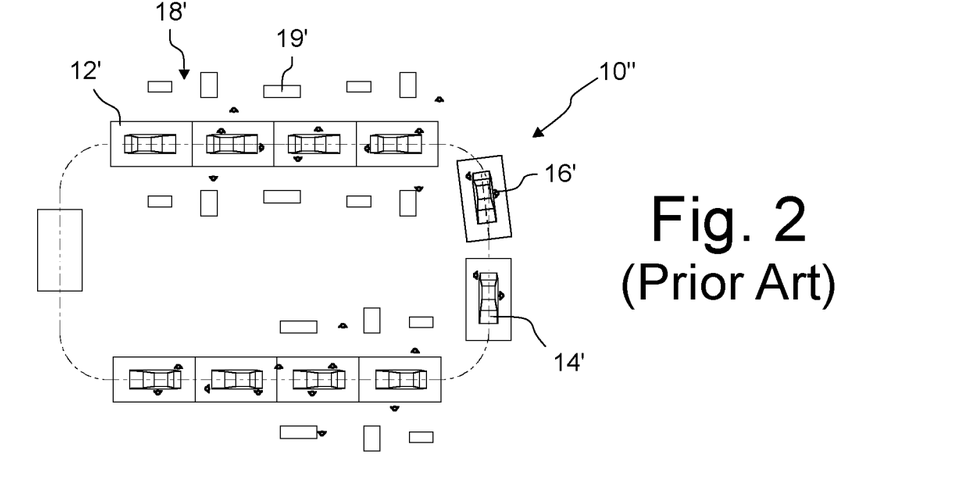
FIG. 2 shows a conveyor system from Prior Art, in which the vehicles perform a cornering at the end of a pushed unit and are then attached to the end of a parallel pushed unit moving forward in the opposite direction.
Figure 3:
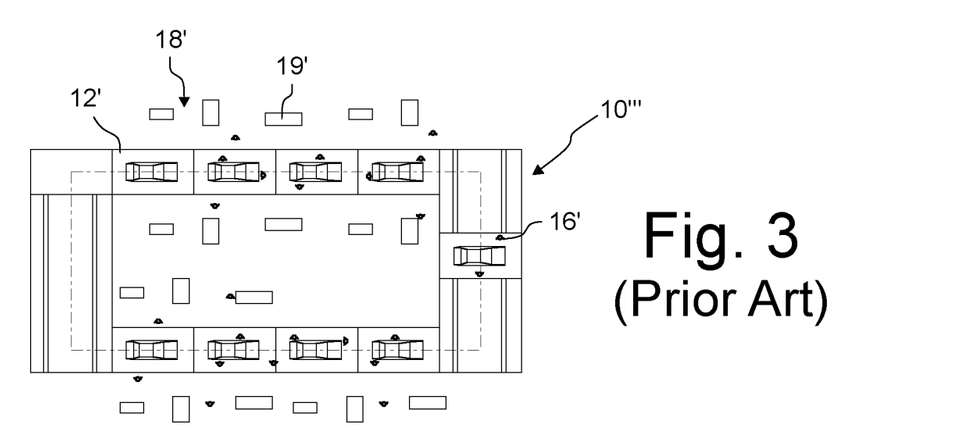
FIG. 3 shows a conveyor system according to Prior Art, in which the vehicles are moved sideways at the end of a pushed unit for transfering.

FIGS. 2 and 3 show alternatives of how the vehicles 12' are led back to the starting point in Prior Art. In the conveyor system 10" shown in FIG. 2, the vehicles 12' are separated at the end of the production line and turned by 180° in a cornering. The processing and assembly are continued in an adjacent section of the production line. As a result, the vehicles 12' circulate in a loop, so that short empty runs only occur in the cornering sections.

A further variant from the Prior Art is shown in FIG. 3. In the conveyor system 10''' shown there, the vehicles 12' are moved sideways at the end of the pushed sections, for which purpose the vehicles 12' are fitted with special chassis. The vehicles 12' are thus not turned around as in the embodiment shown in FIG. 2, but rather always point in the same direction.

For all conveyor systems shown in FIGS. 1 to 3, a fixed cycle sequence with fixed cycle times is specified by driving in a pushed unit. Since the pushed unit can only move forward at a uniform speed, the individual processing steps must be divided such that they require approximately the same amount of time. If, for example, there were difficulties with the installation of a part which led to a delay, the entire pushed unit must be stopped. Driving in a pushed unit thus ultimately dictates the entire production process.

2. Structure of the Conveyor System

Figure 4:
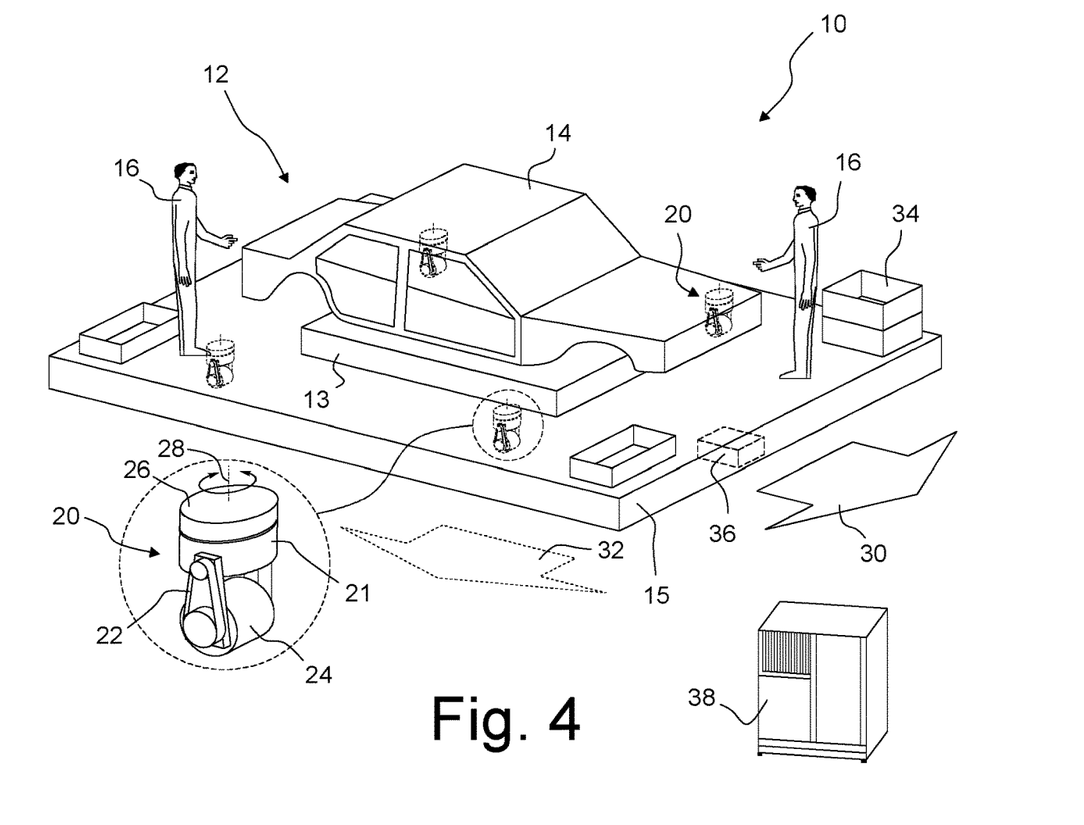
FIG. 4 shows a perspective view of a vehicle of a conveyor system according to the invention, which has an omnidirectional drive.

FIG. 4 shows in a perspective view a vehicle 12 which is part of a conveyor system 10 according to the invention. The vehicle 12 has a workpiece mount 13 known in itself, to which a workpiece to be processed, here also a not yet fully assembled motor vehicle 14, is fixed. The vehicle 12 also includes an assembly platform 15, which can be walked on by workers 16. The vehicle 12 also has its own drive, which in the embodiment shown comprises four drive-turn-modules 20.

As can be seen in the enlarged view, each drive-turn-module 20 comprises a motor unit 21 and a drive wheel 24 driven by a belt 22, which form a drive unit. This drive unit can be rotated relative to a bracket 26 around a vertical axis 28, as is known in itself in Prior Art. For the rotation of the drive unit around the vertical axis 28 a further motor is provided, which is not shown in FIG. 4. The drive-turn-modules 20 are embedded in the mounting platform 15 such that only the drive wheels 24 project downwards.

If the drive units of all the drive-turn-modules 20 are in the turn position shown in FIG. 4 with respect to their vertical axis 28, the vehicle 12 moves along its longitudinal direction when the drive wheels 24 are turned, as indicated by an arrow 30. If the drive units are all rotated 90° with respect to their vertical axis 28, the vehicle 12 can drive perpendicular to its longitudinal direction 30 from a standstill, i.e. without first cornering, as indicated by a dotted arrow 32. By controlling the drive-turn-modules 20 accordingly, rotations on the spot or diagonal traveling can also be realised.

On the top side of the assembly platform 15 there are several containers 34 in which the parts to be assembled, other materials or tools, which the workers need for processing, are kept ready.

A control unit 36, which communicates wirelessly with a central control device 38 of the conveyor system 10, is integrated in the assembly platform 15. The control unit 36 comprises a navigation system, in which the vehicle 12 can orient itself in a production hall, and a collision avoidance device. Control units 36 with these functions are known in and of themselves from automated guided vehicle systems (AGV), which is why this will not be explained in further detail at this point. The vehicle 12 is thus able to move freely between several processing stations in a production hall. Preferably, the vehicle 12 is not bound to a predetermined track during such drives. In principle, however, controls are also considered in which the vehicles 12 move along predetermined driving paths, which are specified by conductive paths laid in the ground or similar.

Figure 5:
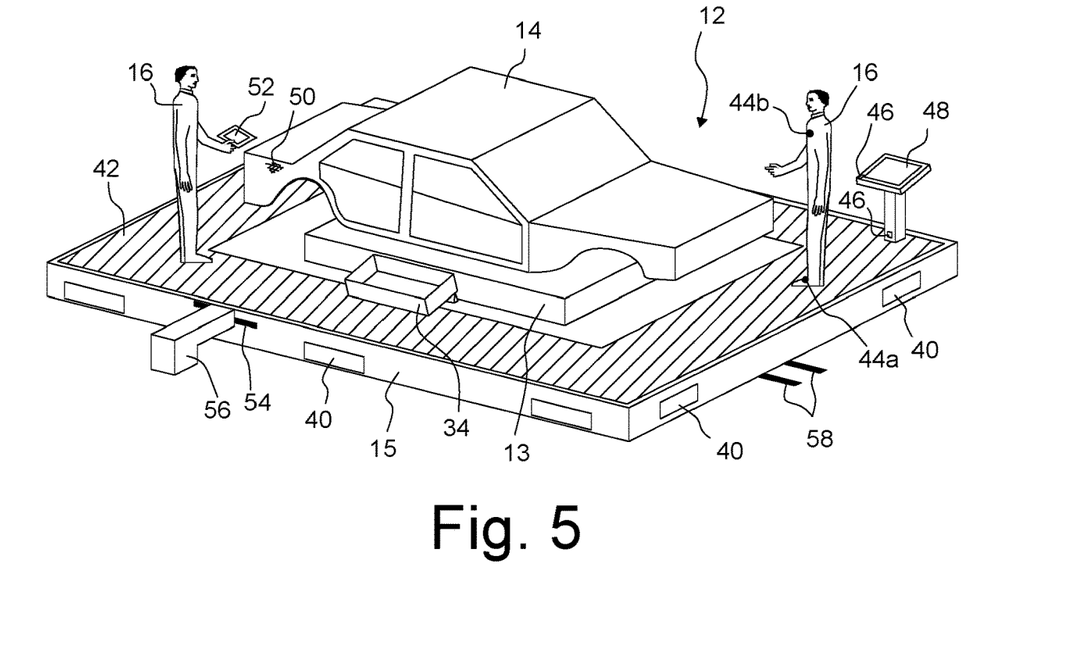
FIG. 5 shows another embodiment for a vehicle according to the invention, in which the assembly platform is covered with a touch-sensitive floor covering.

FIG. 5 shows in a view based on FIG. 4 another embodiment for a vehicle 12. Sensors 40 are arranged on the front and side faces of the assembly platform 15 for orientation and/or collision avoidance purposes. The sensors 40 can, for example, be designed as laser scanners or ultrasonic sensors.

The upper side of the assembly platform 15 is covered by a touch-sensitive floor covering 42, with which it is possible to detect in a location resolved manner where the workers 16 are at a given time on the assembly platform 15. Such touch-sensitive floor coverings are known from the Prior Art (see for instance DE 10 2006 007 780 A1) and make it possible to detect the location of a worker 16 on the assembly platform 15 with a location resolution of less than 50 cm. By using pressure detection cells, as known from DE 10 2011 105 595 A1, the pressure exerted by the workers 16 on the floor covering 42 can also be detected. This makes it possible to distinguish the positions of the workers 16 from the positions of other objects (e.g. a container 34) located on the assembly platform 15.

FIG. 5 on the right shows a worker 16 carrying two identification elements 44a, 44b. The identification elements 44a, 44b can, for example, be integrated into the sole of a shoe or into the pocket of a jacket and be designed as RFID transponders. The identification information stored in the identification elements 44a, 44b can be read out with the aid of reading devices 46, which can be arranged at different locations on the vehicle 12. In combination with the touch-sensitive floor covering 42, the control unit 36 not only knows where the workers 16 are on the assembly platform 15, but also who the workers 16 are. This can be used, for example, to allow further processing or starting of the vehicle 12 only when the designated worker or workers 16 are on the assembly platform 15.

With the help of a touch-sensitive screen 48, the workers 16 can directly intervene in the control of the vehicle 12. In addition to functions such as emergency stop or slow speed, new destinations can also be specified. If, for example, a worker 16 determines that there is a defect indicated at 50 on the motor vehicle 14, the worker can use the touch-sensitive screen 48 to inform the control unit 38 that a certain processing station has to be approached again. The pre-planned route of vehicle 12 is then changed accordingly, which can also result in interventions in the routes of the other vehicles 12. The vehicle 12 with the affected motor vehicle 14 can then, for example, be driven out sideways and backwards in order to approach a certain processing station again. If the worker 16 so wishes, a processing station can also be approached which is specially designed for post-processing. The decision as to which processing station should be approached in the event of a defect in the motor vehicle 14 can also be made by the central control device 38 or by a production specialist responsible for production.

Instead of a permanently installed touch-sensitive screen 48, a mobile input device 52 can also be used to transmit certain information, e.g. a new destination, to the central control device 38. This communication can, of course, be bidirectional, so that the worker can see, for example, whether the desired processing station can be approached immediately or whether this is only possible at a later point in time.

The drive-turn-modules 20 of the vehicle 12 are supplied with electrical energy by an accumulator in the illustrated embodiment. To charge the accumulator, the mounting platform 15 has sliding contacts 54 on the side, with which a counter contact 56 abuts in a specific charging position of the vehicle 12. The accumulator can then be charged in a standstill via the sliding contacts 54.

The vehicle 12 also has the option of charging the accumulator electrically while driving. For this purpose, strip-shaped charging contacts 58 are embedded on the floor of the production hall, which abut with corresponding counter contacts of the vehicle 12. This reduces or even completely eliminates the downtime of the vehicles 12 as a result of the charging processes required, particularly in the case of production processes in which the vehicles 12 are frequently in motion.

Figure 6A:
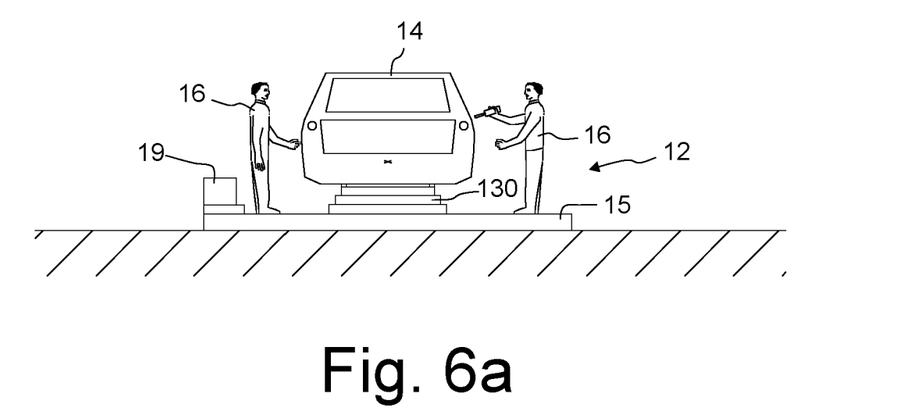
FIGS. 6a-6c shows a rear view of a vehicle according to the invention, in which a motor vehicle is transferred to different processing heights by means of a lifting drive.
Figure 6B:
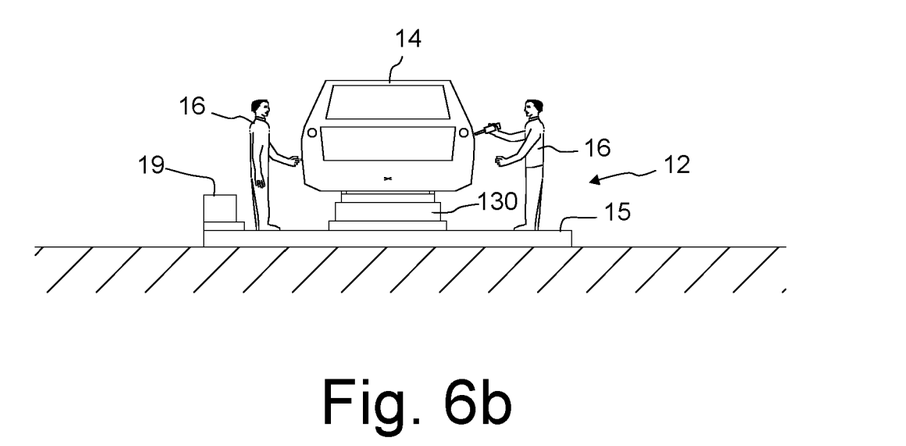
Figure 6C:
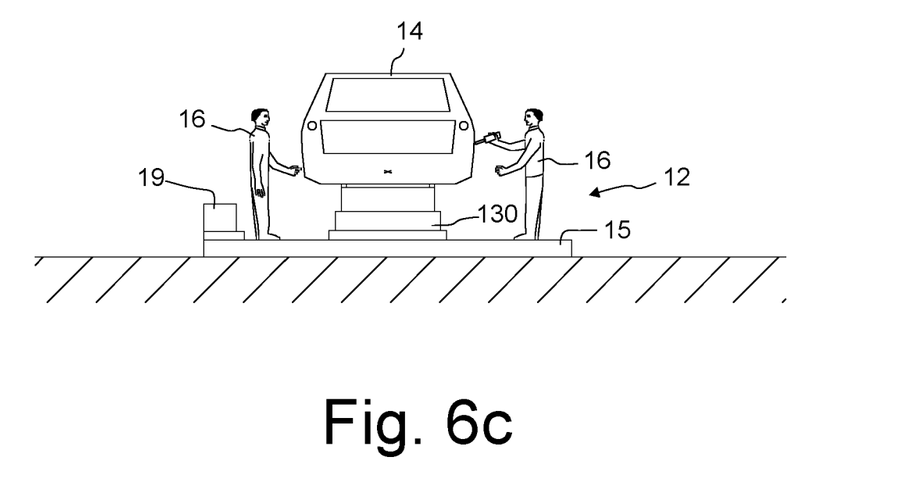

The workpiece mount of the vehicles 12 can also be designed as a lifting table 130, as illustrated by FIGS. 6a to 6c in a rear view of a vehicle 12 for different lifting heights. This allows the motor vehicle 14 to be positioned at different heights above the assembly platform 15, so that the workers 16 can comfortably perform all the necessary processing steps while standing.

3. Function

Figure 7:
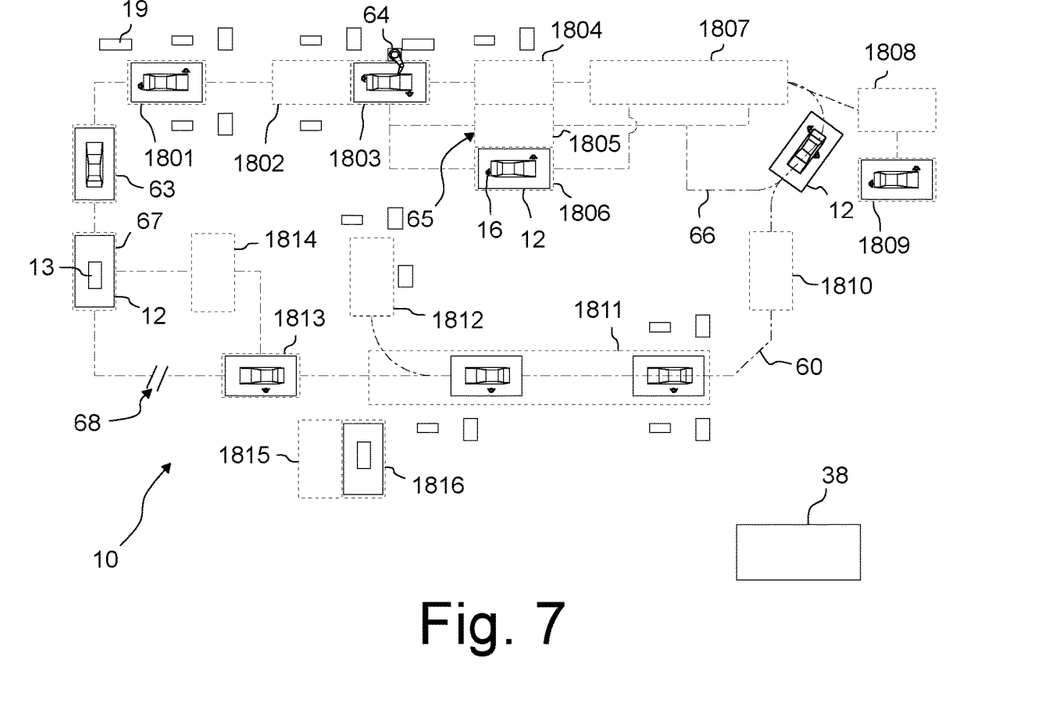
FIG. 7 shows a schematic top view of a conveyor system according to the invention, in which a plurality of vehicles approach different sequences of processing stations.

FIG. 7 shows in a schematic top view a conveyor system 10 according to the invention in which a plurality of vehicles as well as several processing stations 1801 to 1816 indicated by dotted lines can be identified. In many processing stations 1801 to 1816 there are vehicles 12; at the right edge of FIG. 7 a vehicle 12 during cornering between two processing stations 1807 and 1810 can be identified.

In the embodiment shown, the vehicles drive on a driving path network 60 in which they orient themselves with the aid of navigation devices such as radio-based navigation systems, laser scanners, cameras or ultrasonic sensors.

On the left of FIG. 7 a pick-up station 63 is shown in which the motor vehicle 14 is placed on the workpiece mount 13 of an available vehicle 12. The workers 16, however, only step on the vehicle 12 after it has reached the first processing station 1801 shown in FIG. 7, top left. The vehicle 12 remains stationary in this first processing station until the processing operation provided there has been completed. The workers can signal this by means of a "finished" signal on the touch-sensitive screen 48. Alternatively, a fixed cycle can also be specified at the end of which the vehicle 12 moves out of the first processing station 18. The workers 16 can now remain on the vehicle 12 and continue processing while it advances to the next processing station 1802.

At the third processing station 1803, a robot 64 supports the processing. The workers 16 must now be far enough away from the robot 64 to avoid being endangered by the movements of the robot arm. The robot 64 is controlled by the central control device 38 such that it does not start processing until the two workers 16 have established a sufficient distance from the robot 64. This is signalled to the central control device 38 by the touch-sensitive floor covering 42 of the vehicle 12.

The third processing station 1803 is located at the entrance of a parallel area 65, which comprises three parallel processing stations 1804, 1805 and 1806. In these processing stations, processing steps are performed that are not required for all motor vehicles 14. In one of the three parallel processing stations, for example, a sliding roof can be mounted, while in another one a roof railing is fitted. Depending on the configuration of the motor vehicle 14 to be produced, the vehicle 12 moves from the third processing station 1803 to one of the three parallel processing stations 1804, 1805 or 1806. To approach the processing stations 1805, 1806, the vehicle 12 is laterally moved by a predetermined distance by rotating the motor units 21 of the drive-turn-modules 20 by 90° with respect to the vertical axis 28 in the manner described above and then returning them to their original position.

Several vehicles 12 can drive into the subsequent processing station 1807 and can be processed simultaneously. There, too, however, it is provided that the vehicles will not form a pushed unit, but will remain separate. In the processing station 1807, the individual vehicles 12 can continue their drive either at slow speed during processing ("on-the-fly" processing) or stop at a suitable position.

Should the processing of a motor vehicle 14 take an unexpectedly long time in a processing station, the vehicle transporting the respective motor vehicle can leave the processing area 1807 and be returned to the processing area 1807 via a return section 66. As a result, subsequent vehicles 12 do not have to wait for the completion of processing of a motor vehicle 14 transported by a vehicle 12 traveling ahead. The vehicle 12 thus allows the following vehicles 12 to overtake by merging into the return section 66 and then re-entering the processing area 187 by lateral displacement.

On the right in FIG. 7, two processing stations 1808, 1809 can be identified, which serve for post-processing. These processing stations 1808, 1809 are only approached by such vehicles 12, where the workers 16 have determined that the motor vehicle 14 has a defect 50. As already mentioned above, the workers 16 inform the central control device 38 about this with the help of the touch-sensitive screen 48 and the mobile input device 52. The processing stations 1808, 1809 provided for post-processing thus make it possible to perform post-processing without subsequent vehicles 12 having to wait.

The following processing stations 1810 and 1811 will again be approached by all vehicles 12. The processing station 1812, on the other hand, can only be reached via cornering and is only approached by certain vehicles 12 and left backwards again after processing.

This is followed by the processing station 1813, from where the vehicles 12 travel either directly or via a processing station 1814 to a delivery station 67, where the motor vehicle 14 is removed. Two oblique lines in FIG. 7 indicate a blockade 68 located on the direct path between the processing station 1813 and the delivery station 67. Therefore, the vehicles 12 cannot use this part of the driving path network 60 indicated by 60. For this reason, all vehicles 12 are exceptionally guided via the 1814 processing station.

Below in FIG. 7 two further processing stations 1815 and 1816 are indicated. These processing stations 1815, 1816 are not used for processing motor vehicles 14, but are repair stations for vehicles 12. If repair work is required, after being unloaded at the delivery station 67, the vehicles 12 can be driven to the processing stations 1815, 1816, where they can be serviced or repaired.

Figure 8:
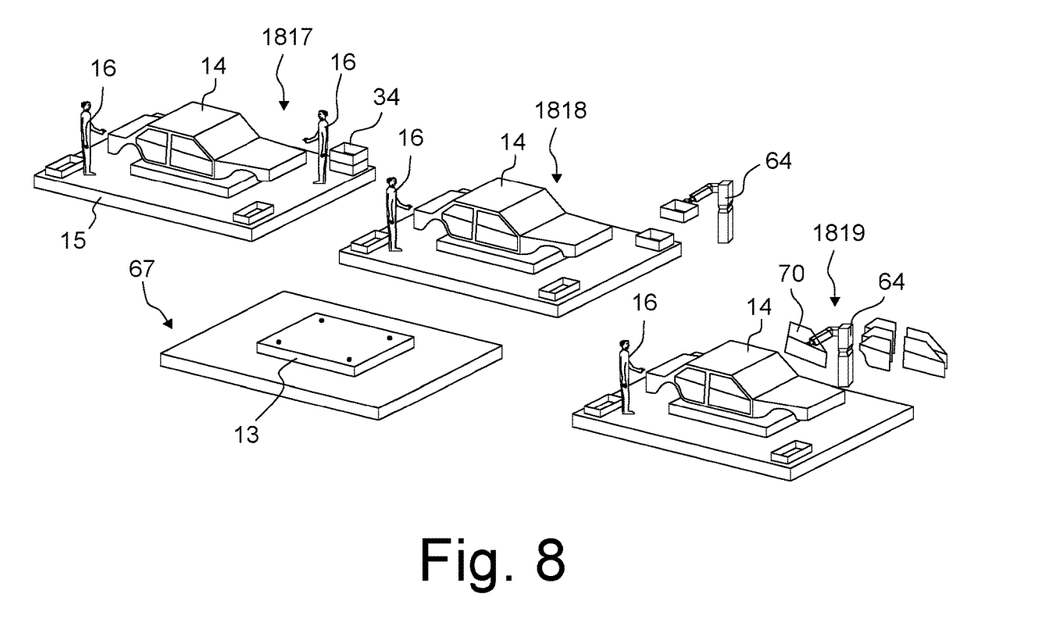
FIG. 8 shows a perspective view of a plurality of vehicles in different processing stations.

FIG. 8 shows an arrangement of several closely adjacent processing stations 1817 to 1819 in a perspective view. In the processing station 1817, two workers 16 are on the assembly platform 15 and assemble parts on the motor vehicle 14, which are stored in the containers 34.

In the processing station 1818 there is only one worker 16 on the assembly platform. A robot 64 replaces an empty container 34 with a full container during processing by the worker 16 or provides the parts to be installed.

At the processing station 1819, there is also only one worker 16 on the assembly platform 15. The robot 64 is used here to mount vehicle doors 70 on the motor vehicle 14.

At the bottom left the delivery station 67 is shown, in which the motor vehicles 14 are removed from the vehicles 12.

Figure 9:
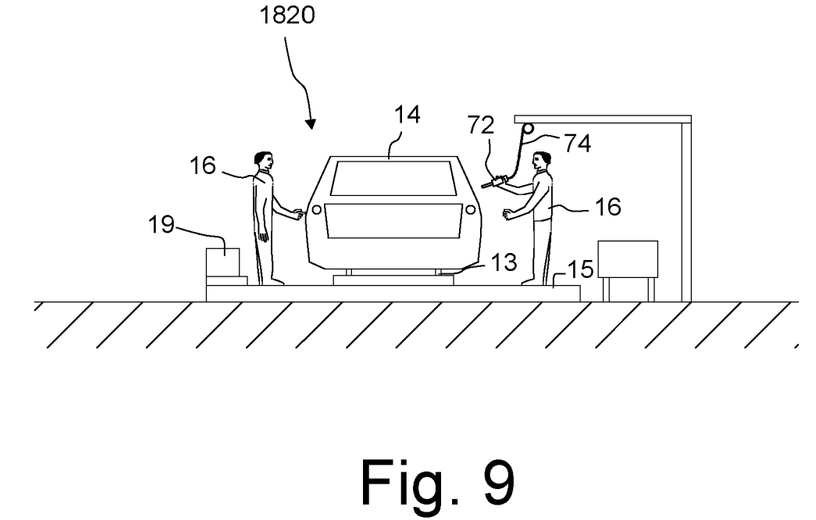
FIG. 9 shows a rear view of a vehicle in a first processing station in which only workers are active.

FIG. 9 shows in a rear view a processing station 1820 in which two workers 16 are located on the assembly platform 15. At this processing station 1820 there is a tool 72 which is supplied with power via a cable 74.

Figure 10:
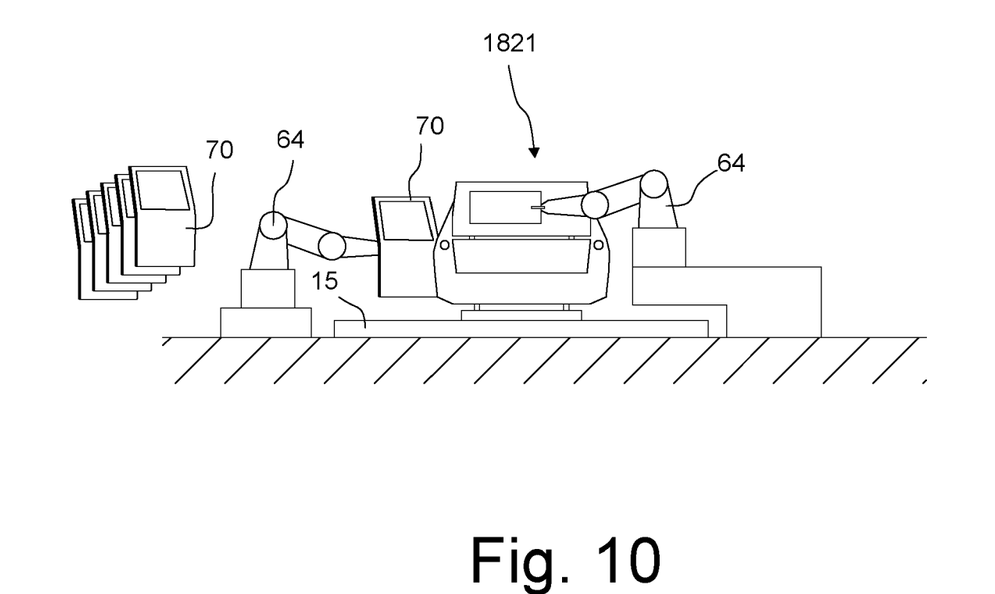
FIG. 10 shows a rear view of a vehicle in a second processing station in which only robots are active.

FIG. 10 shows in a rear view another processing station 1821 in which processing is performed entirely by robots 64. The robot 64 shown on the left installs vehicle doors 70 in this embodiment, while the robot 64 shown on the right inserts a rectangular element in the rear area of the motor vehicle 14. For safety reasons, no worker 16 may be located on the assembly platform 15 during this fully automatic processing. It can be seen that one foot of the robot 64 shown on the right reaches far over the assembly platform 15, which would acutely endanger a worker.

4. Further Embodiments

Figure 11:
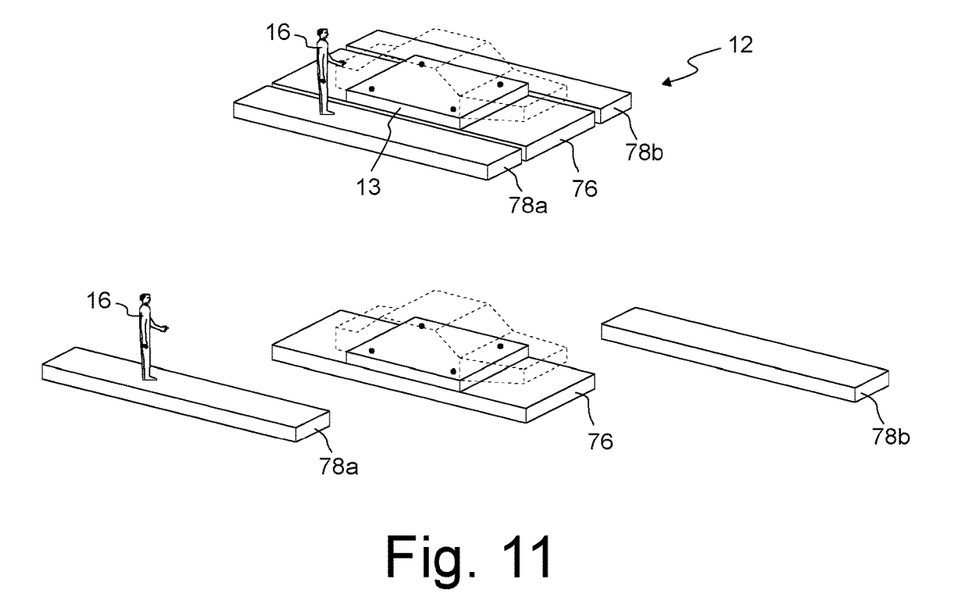
FIG. 11 shows a perspective view of a vehicle according to another embodiment, in which the vehicle can be divided into several independently traveling subunits.

FIG. 11 shows in a perspective view a vehicle 12 composed of several subunits. In the embodiment shown, these subunits are a workpiece carrier unit 76 arranged in the middle of the vehicle 12, which carries the workpiece mount 13, and two platform units 78a, 78b, which can be walked on by the workers and are each coupled to a long side of the workpiece carrier unit 76. The workpiece carrier unit 76 as well as the two platform units 78a, 78b each have their own chassis and their own drive, so that the three subunits can move independently of each other.

At the bottom of FIG. 11 the three subunits 76, 78a, 78b are shown separate from each other. It can be seen that in the illustrated embodiment the three subunits do not have any mechanical couplings with which they can be coupled to each other along their long sides. Here, the coupling occurs by purely electrical-control-related means. For this purpose, the subunits are controlled in such a way that they travel next to each other at a close distance. As one can identify at the top of FIG. 11, the gap between subunits 76, 78a, 78b is so narrow that it poses no danger to the workers 16. To ensure that the gaps between the subunits have an approximately constant width during operation, the subunits have distance sensors on their long sides which are part of a control loop which ensures that the gap width is maintained.

In particular, it is possible that the three subunits are controlled according to the superordinate/subordinate principle. This means that one of the subunits, for example the workpiece carrier unit 76, is assigned the role of a superordinate unit. The superordinate unit is controlled in exactly the same way as explained in connection with the embodiments for the vehicles 12 described above. For this purpose, the superordinate unit can in particular have navigation and collision avoidance means. The two other subunits, here the platform units 78a, 78b, are operated as subordinate units. This means that they do not approach the destination independently of the superordinate unit, but follow the superordinate unit. For this purpose, the subordinate units have the distance sensors already mentioned and suitable control electronics that ensure that they travel next to the workpiece mounting unit 76 without significantly changing their relative position to the workpiece carrier unit 76.

Of course it is also considered to mechanically couple the subunits to one another. Usually, it is sufficient if only the drive of one of the three subunits is actuated.

To form the vehicle 12 shown at the top of FIG. 11, the superordinate unit—in this case the workpiece carrier unit 76—can send a request command to the control device 38. This determines which platform units are available and instructs the selected platform units to drive automatically to the workpiece carrier unit 76. As soon as the two platform units 78a, 78b have taken their correct position relative to the workpiece carrier unit 76, the superordinate/subordinate principle is changed, in which the platform units 78a, 78b follow the workpiece carrier unit 76.

Figure 12:
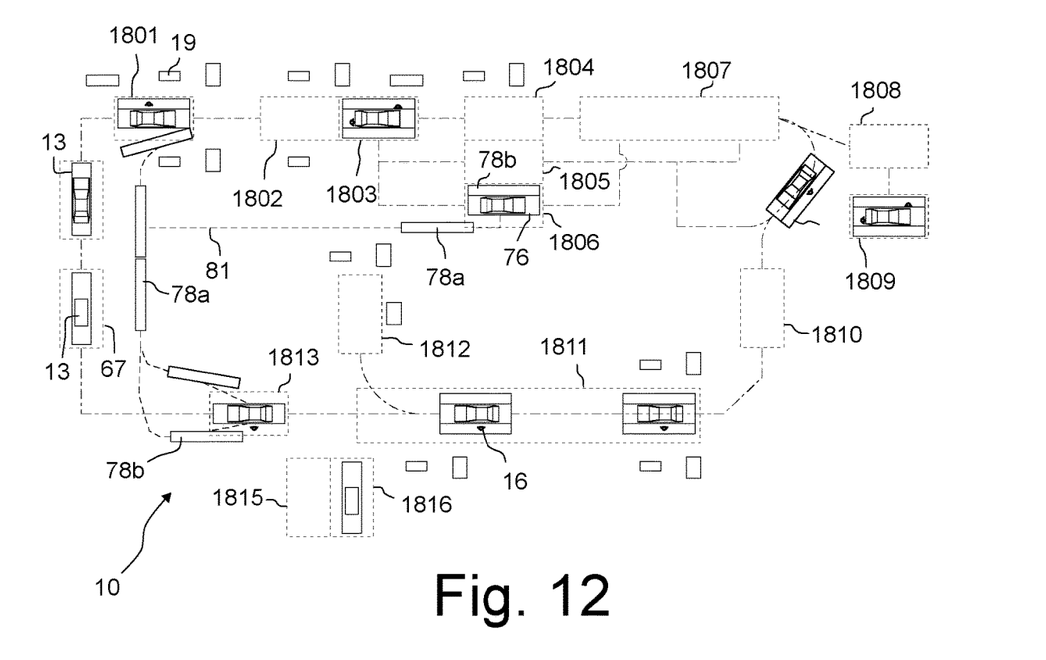
FIG. 12 shows a view of a conveyor system based on FIG. 7, in which the vehicles shown in FIG. 11 are driving.

FIG. 12 shows in a view based on FIG. 7 a conveyor system 10 in which the vehicles 12 are constructed from three subunits the way shown in FIG. 11. One can identify that in the processing station 1806 the platform unit 78a on the right, seen in the direction of travel, was uncoupled. As a result, the right-hand side of the motor vehicle 14 is exposed in such a way that processing can be performed in the lower area of the motor vehicle 14 without the motor vehicle 14 having to be lifted beforehand with the aid of a lifting device. The uncoupled platform unit 78a is returned along a return section 81, integrated into a queue and coupled to another vehicle workpiece carrier unit 76, which later passes through the processing stations 1801 to 1813.

The vehicle 12, whose right platform unit 78a was uncoupled in the processing station 1806, passes through the remaining processing stations only with the workpiece carrier unit 76 and the 78b coupled to the left side. Other vehicles that do not approach the processing station 1806, however, remain complete throughout the processing procedure shown in FIG. 12. Only at the end of the processing procedure both platform units 78a, 78b are uncoupled, as shown in the lower left of the processing station 1813. Therefore only the workpiece carrier unit 76 without platform units 78a, 78b drive into the delivery station 67 and the pick-up station 63.

Figure 13:
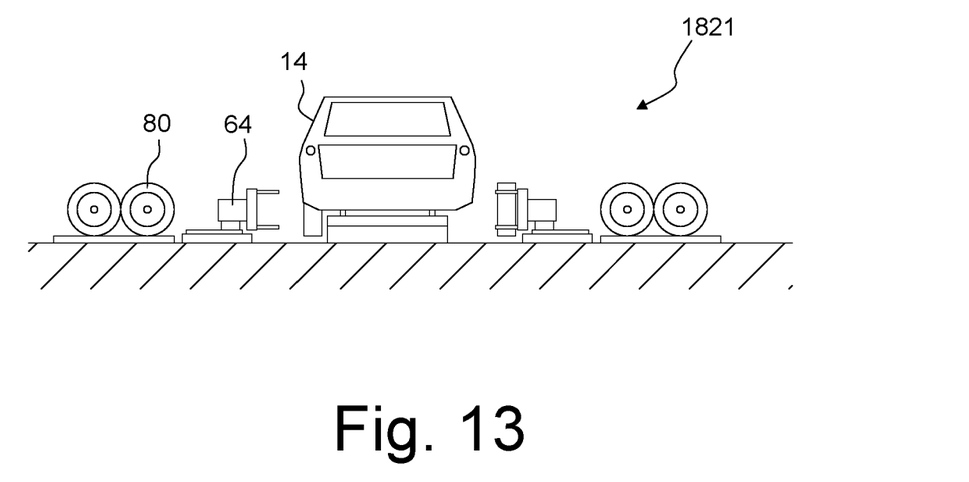
FIG. 13 shows a processing station that is only approached by a workpiece carrier unit.

FIG. 13 shows a rear view of a processing station 1821, wherein both platform units 78a, 78b were uncoupled from the vehicle 12. The motor vehicle 14 is therefore only transported by the workpiece carrier unit 76. In this way, the wheel cutouts of the motor vehicle 14 are freely accessible, so that assembly robot 64 can easily attach the provided wheels 80 to the axles of the motor vehicle 14.

Figure 14:
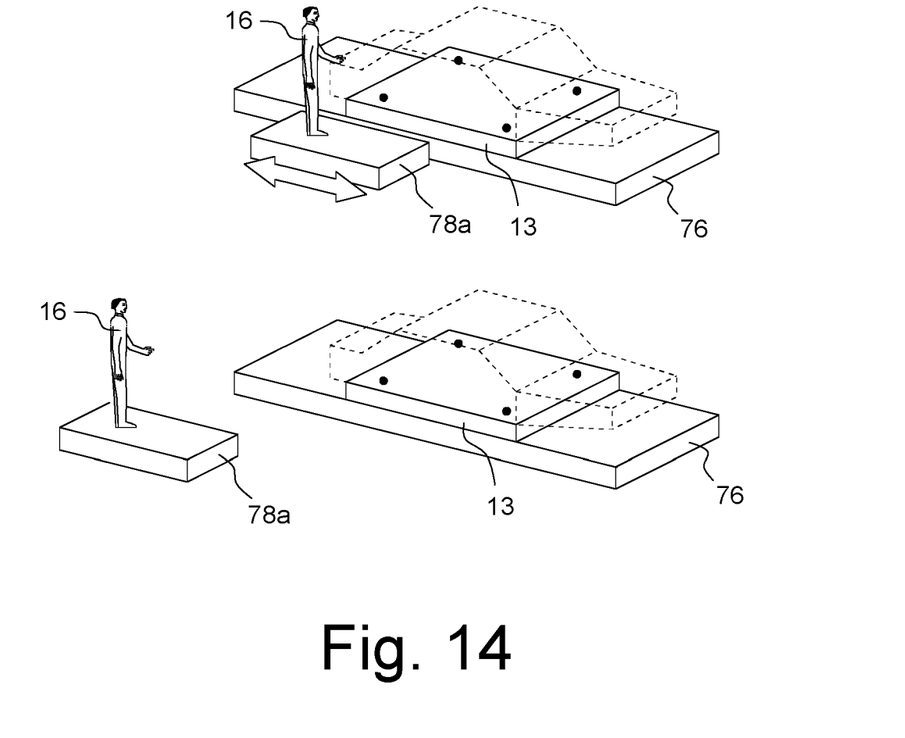
FIG. 14 shows a perspective view of a vehicle consisting of a larger workpiece carrier unit and a shorter platform unit.

FIG. 14 shows a variant in which only one platform unit 78a is provided, which is shorter in the longitudinal direction of the vehicle 12 than the workpiece carrier unit 76. If the two subunits 76, 78b are in the superordinate/subordinate operation, the platform unit 78b can be controlled such that it moves past the workpiece carrier unit 76 at a close distance, as indicated by a double arrow in FIG. 14. This relative movement is also possible when the workpiece carrier unit 76 is in motion. A worker 16 located on the platform unit 78a is thus guided uniformly or with a desired velocity curve past the motor vehicle 14. In this way, he can perform processing steps on the motor vehicle 14 which are difficult to carry out if the worker 16 has to carry out this relative movement himself. The worker 16, for example, can kneel on platform 78a while passing the workpiece carrier unit 76 in order to attach a low-lying trim or similar to the body.

Of course such a relative movement is also possible if the platform units 78a, 78b are not shorter than the workpiece carrier unit 76. In this case, however, the entire length of the vehicle 12 changes during the relative movement, which requires more space overall.

Figure 15:
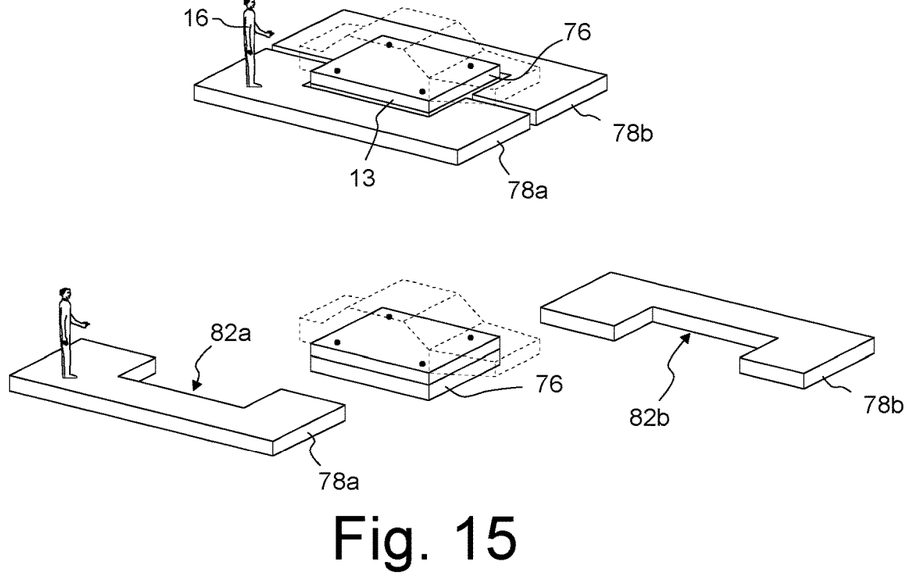
FIG. 15 shows a perspective view of a vehicle according to another embodiment, in which a workpiece carrier unit engages in lateral recesses of two platform units.

FIG. 15 shows another variant in an illustration based on FIG. 11, in which the two platform units 78a and 78b each have a lateral cut-out 82a and 82b respectively. The shape of the cut-outs 82a, 82b is selected such that the workpiece carrier unit 76, which is arranged in the middle, can be inserted into it laterally. In this way, a form fit is achieved between the workpiece carrier unit 76 and the two adjacent platform units 78a, 78b, which increases the stability of the assembly platform. In particular, it is possible to design either the support unit 76 or the two platform units 78a, 78b without their own drive. Due to the form fit connection between the subunits, either the workpiece carrier unit 76 as a superordinate unit can transport the two non-driven platform units 78a, 78b, or vice versa, the two subordinate units 78a, 78b can transport the workpiece carrier unit 76 received between them.

Figure 16:
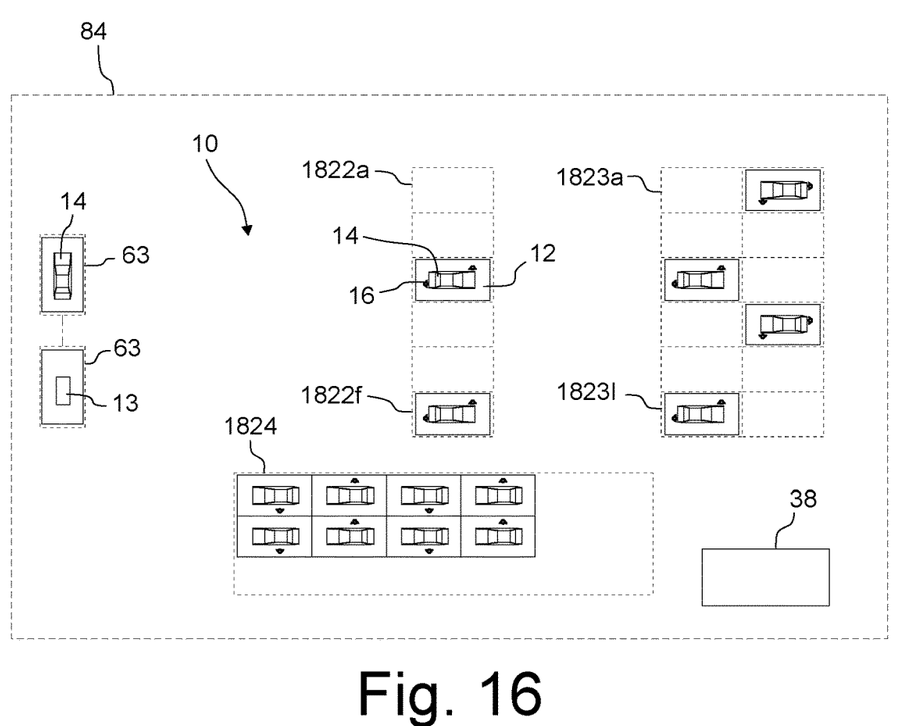
FIG. 16 shows a view of a conveyor system based on FIG. 7 according to a further embodiment, in which the processing stations for the vehicles within a production area can be freely selected within certain limits.

FIG. 16 shows a conveyor system 10 in an illustration based on FIG. 7 according to another embodiment, in which the processing stations are no longer located at permanently fixed locations within a production area 84, but can be variably distributed within certain limits within a given production area 84. These limits are set in particular by the non-changeable building infrastructure, such as the location of supply connections or fixed conveyor systems such as overhead conveyors.

On the left of FIG. 16 the pick-up station 63 and the delivery station 67 are shown in which the motor vehicle 14 is picked up and delivered respectively. In the middle of FIG. 16 a first group of processing stations 1822a to 1822f is shown, in which different processing steps are performed. These processing steps can be selected to exclude each other, for example the assembly of a folding roof in the processing station 1822a and the assembly of an electric sliding roof in the processing station 1822b. The infrastructure for the individual processing stations 1822a, which is not shown in FIG. 16, can also preferably be moved on vehicles and is suitably delivered to the processing stations. A similar group with several processing stations 1823a to 1823l is shown farther to the right in FIG. 16. Extra no driving routes, because vehicles choose their own route.

At the bottom of the production area 84 there is a processing station 1824 which is uniform in the sense that the same processing steps are performed at all locations. However, this processing station 1824 can also be spatially relocated or changed in size.

These mobile processing stations 1822 to 1824 make it possible to react flexibly to changing requirements in the production process. If, for example, fewer motor vehicles with sliding roofs and more motor vehicles with folding roofs are required, processing stations for the assembly of a sliding roof can be converted into processing stations for the assembly of a folding roof. If vehicles with sliding roofs are no longer manufactured, the processing stations concerned can be dismantled and the other processing stations can be relocated if necessary to create free driving paths between the processing stations.

What is claimed is:

1. A conveyor system for the simultaneous transport of workpieces and workers, comprising:
   a plurality of vehicles each having a workpiece mount, an assembly platform which can be walked on by workers, and a drive configured to drive each respective vehicle from the plurality of vehicles independently of other vehicles from the plurality of vehicles of the conveyor system,
   a plurality of processing stations configured to perform different processing steps, and with
   a control device for controlling the plurality of vehicles, wherein
      the control device is configured to control the plurality of vehicles such that the plurality of vehicles individually travel different sequences of the plurality of processing stations depending on a workpiece being transported, and
      the plurality of vehicles each have a detection device configured to detect the presence of a worker on the respective assembly platform.

2. The conveyor system according to claim 1, wherein each of the detection devices are configured to detect the location of any worker detected on the respective assembly platform.

3. The conveyor system according to claim 2, wherein each of the detection devices are configured to detect the location of a worker on the respective assembly platform with a location resolution of at least 50 cm.

4. The conveyor system according to claim 1, wherein at least some of the plurality of processing stations are arranged such that they can only be approached by the plurality of vehicles by traveling sideways or cornering without a reversal of the direction of travel.

5. The conveyor system according to claim 1, wherein the plurality of vehicles each have an omnidirectional drive with which each vehicle can drive in any direction from a standstill.

6. The conveyor system according to claim 1, wherein each of the detection devices comprise an identification element to be worn by the worker and a reading device arranged on the vehicle and configured to read information stored on the identification element contactlessly.

7. The conveyor system according to claim 1, wherein each of the detection devices comprise a touch-sensitive floor covering which covers at least part of the respective assembly platform.

8. The conveyor system according to claim 1, wherein the control device is configured to control the plurality of vehicles such that a first vehicle from the plurality of vehicles overtakes a second vehicle from the plurality of vehicles while the second vehicle is in one of the processing stations from the plurality of processing stations.

9. The conveyor system according to claim 1, wherein at least one vehicle from the plurality of vehicles has an input device which is accessible to a worker located on the assembly platform and via which the worker can specify to the control device one processing station from the plurality of processing stations which the at least one vehicle still has to approach.

10. The conveyor system according to claim 1, wherein at least one vehicle from the plurality of vehicles is composed of a plurality of subunits which
   are arranged side by side transversely with respect to a longitudinal direction of the at least one vehicle, as well as
   are detachably coupled to each other, and
   comprise chassis which are separate from one another, so that each of the of subunits can be moved separately and independently of one another after uncoupling, wherein at least one of the plurality of subunits has its own drive.

11. The conveyor system according to claim 10, wherein a first subunit of the plurality of subunits is a workpiece carrier unit which comprises the workpiece mount and a second subunit is a platform unit which can be walked on freely by workers.

* * * * *